United States Patent Office 3,069,374
Patented Dec. 18, 1962

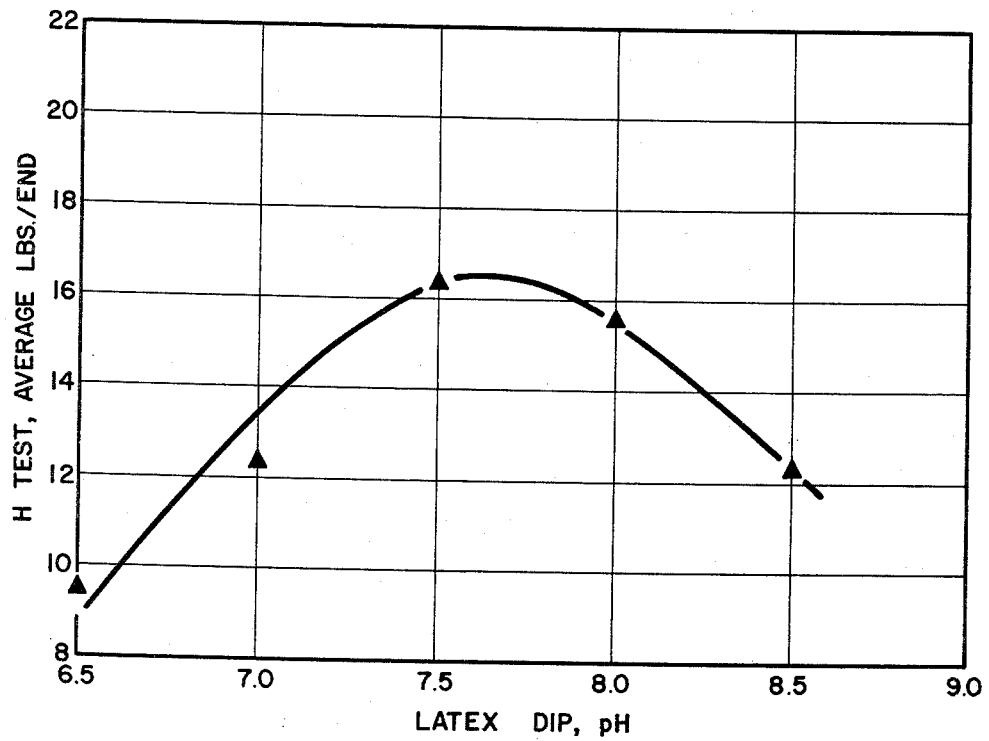

3,069,374
PROCESS FOR PREPARING BUTYL RUBBER LATEX CONTAINING PHENOL-ALDEHYDE RESIN AND AN AMMONIUM ALKYL SULFATE
Edward Allen Hunter, Baton Rouge, La., assignor to Esso Research and Engineering Company, a corporation of Delaware
Filed May 7, 1958, Ser. No. 733,770
15 Claims. (Cl. 260—29.3)

This invention relates to a method for preparing butyl rubber emulsions and to the improved emulsions formed thereby. More particularly, the present invention relates to preparing, by an inversion technique or preferably by a solution technique, an emulsion of butyl rubber in water at a pH of about 7.0 to 8.5 and preferably stabilized by certain ammonium salts of alkyl sulfates. In a preferred embodiment of the present invention, a solution of butyl rubber, dissolved in a $C_5$ to $C_{10}$ hydrocarbon, is emulsified with water in the presence of the above-mentioned alkyl sulfate salts as more fully described hereinafter.

The invention will be best understood from the following description when read in connection with the accompanying drawing in which the single FIGURE is a graph of tire cord adhesion plotted against the pH of the latex dip.

One of the major factors in the preparation of butyl rubber latices is the particular emulsifier system used. Upon this will depend the ease of making and final stability of the latex as well as the strength of the final bond between latex coated tire cords and a tire carcass. In addition, very high emulsifier concentrations would increase the cost excessively. While many emulsifier systems are suitable for laboratory use, most of these fail when transfer is made to large plant scale operations.

It is, therefore, an object of this invention to provide an improved emulsifier system for preparing butyl rubber emulsions.

It is another object of this invention to provide a method for preparing a butyl rubber latex of improved adhesion to nylon tire cords.

It is a still further object of this invention to provide a process of preparing a composition of a butyl rubber latex containing a phenolic aldehyde resin, said composition causing a superior adhesion between tire cords and a butyl rubber carcass in which they are imbedded.

These and other objects and advantages of the invention are accomplished by emulsifying a solution of the butyl rubber at a pH of between about 7.0 and 8.5 and preferably between about 7.0–7.3 to 8.0 in the presence of an emulsifier system comprising an ammonium salt of an alkyl sulfate. The alkyl sulfate salts, useful for the purposes of the present invention fall within the following formula: $CH_3(CH_2)_xSO_4NY$ in which X is 6 to 24, preferably 8 to 20 and Y is selected from the group consisting of $H_4$, $H_3(C_nH_{2n}OH)$, $H_2(C_nH_{2n}OH)_2$,
$H(C_nH_{2n}OH)_3$, $H_3(C_mH_{2m+1})$,
$H_2(C_mH_{2m+1})_2$, $H(C_mH_{2m+1})_3$ and mixtures thereof in which $n=1$ to 6, preferably 2 to 4, and $m=1$ to 10, preferably 1 to 3. Typical alkyl sulfate salts falling within the foregoing class are ammonium lauryl sulfate, monoethanolammonium cetyl sulfate, diethanolammonium lauryl sulfate, triethanolammonium lauryl sulfate, triethylammonium stearyl sulfate, diisopropylammonium decyl sulfate, etc.

The butyl rubber to which the above emulsifier system is applicable in the formation of latex is a copolymer of a $C_4$ to $C_8$ isoolefin such as 2-methyl-1-butene or especially isobutylene with a $C_4$ to $C_{14}$ multiolefin, preferably a conjugated diolefin, prepared at low temperature by a dissolved Friedel-Crafts catalyst. The major component of the copolymer is preferably isobutylene. The minor component is a multiolefin having from 4 to 10 or 12 carbon atoms per molecule. The preferred multiolefins are butadiene, isoprene, dimethyl butadiene, dimethallyl, myrcene, allo-ocymene and the like. Of these materials, isoprene is presently regarded as the best multiolefin. The isobutylene and the multiolefin are mixed in the ratio of a major proportion of isobutylene and a minor proportion of the isoprene, the preferred range with isoprene being from 1 to 30 parts of isoprene with 99 to 70 parts of isobutylene.

The mixture of monomers is cooled to a temperature within the range between −40° C. and −200° C. The cold mixture is polymerized by the addition thereto of a Friedel-Crafts catalyst, preferably in dissolved form, The copolymerization proceeds rapidly to yield the desired polymer which precipitates out from the solution in the form of a flocculent white solid having many of the physical characteristics of raw gum rubber. When the polymerization has reached the desired stage, the material is conveniently recovered by discharging the whole mixture into warm water which may contain an alcohol or other material to inactivate the catalyst. The warm water flashes off the excess refrigerant, unpolymerized olefins and catalyst solvent. The polymer is recovered by filtering or by other means and then dried. Before drying, the polymer shows a Staudinger molecular weight from 20,000 to about 500,000.

In one method of practicing the invention, the butyl rubber, prepared as described above, is dissolved in a solvent. Suitable solvents which may be used to dissolve the polymer may be any liquid in which the polymer is soluble, such as for example $C_5$ to $C_{10}$ hydrocarbon solvents including hexane, heptane, octane, isooctane, the nonanes, the decanes, naphtha fractions, benzene, toluene, Solvesso 100 (a substantially 100% aromatic hydrocarbon fraction boiling 315–350° F.) and Solvesso 150 (a substantially 100% aromatic hydrocarbon fraction boiling 365–415° F.), cyclohexane, and cyclohexene, carbon tetrachloride, trichloroethylene, carbon disulfide, methyl ethyl ketone and the like. More volatile solvents can be used but pressure equipment would be required to minimize evaporation losses. To this solution is added an aqueous solution of an ammonium salt of an alkyl sulfate such as described above. The latex produced generally contains about 0.5–10 and preferably about 1 to 5 parts of alkyl sulfate salt emulsifier per 100 parts of rubber. It is a critical finding of the present invention that the latex must be adjusted to a pH of between 7.0 and 8.5. Therefore, the two solutions are mixed and adjusted to a pH of 7.0 to 8.0, preferably to a pH of 7.3 to 8.0 in a suitable homogenizer, such as a colloid mill, a sonic mixer, a Dispersator, a Waring Blendor or the like. A particularly suitable homogenizer is a sonic mixer known as The Rapisonic Homogenizer. This consists of a gear pump which forces the material through an orifice and impinges the stream on a knife edge or vibrating blade enclosed in a resonating bell.

Although it is within the purview of the present invention to adjust the latex to a pH between about 7 and 8 and subsequently blend in the phenolic aldehyde resin, it is by far preferred first to blend the latex with the resin and finally to adjust the pH of the resulting blend to between about 7 and 8. The preferred phenolic aldehyde resins are phenol-formaldehyde, phenol butyraldehyde, ortho cresol formaldehyde, phenol paraformaldehyde, and especially resorcinol formaldehyde. The molar ratio of the phenolic material to the aldehydic material is generally about 1:2.

In another process of the present invention, the aqueous emulsifier solution is incrementally dispersed in the butyl rubber solution which is the continuous phase. Aqueous emulsifier solution or water addition is then continued until inversion takes place to give a dispersion in which the aqueous medium is the continuous phase.

After emulsification, the solvent may be removed from the emulsion by stripping under vacuum at a temperature above about 100° F. during solvent removal, and near 190° F. during water removal, if a more concentrated latex is desired. Agitation may be needed to prevent hot spots from occurring within the stripping vessel, but it is kept low to minimize mechanical working of the latex.

In order to more fully illustrates the present invention, the following experimental data are given:

*Example I*

7000 cc. of a 23% solution in hexane of a butyl rubber having a Mooney viscosity (212° F. for 8 minutes) of 75, a viscosity average molecular weight of 430,000, and a mole percent unsaturation of 2.5 was homogenized with a dispersator with 3000 cc. of an aqueous solution containing 58 grams of the triethanolamine salt of lauryl sulfate known as triethanolammonium lauryl sulfate. To samples of this latex, each containing 15 grams of solids was then added:

| Component: | Grams |
|---|---|
| Resorcinol | 2.2 |
| Formaldehyde | 3.5 |

Water, to give 100 grams of total sample.

Samples were adjusted to pH values of 6.5 to 9.0 with NaOH and these mixtures were then aged 45 hours at room temperature.

Nylon tire cords were then dipped in the above solutions, air dried, and then dried at 250° F. in a circulating air oven. These cords were then each imbedded in a butyl rubber matrix and cured at 320° F. for 45 minutes.

Each sample having a different pH was then tested for adhesion to the butyl rubber matrix to give an "H" test result in lbs./end on a Scott Tensile Tester. The results were as shown in the accompanying drawing.

Referring now to the accompanying drawing, it will be noted that the maximum adhesion values are obtained at a critical pH range of between 7 and 8.

*Example II*

The same general procedure as in Example I was repeated using as the lauryl sulfate salt, ammonium lauryl sulfate with the following "H" test adhesion results as obtained on an Instron Universal Tester:

| | pH | | | | |
|---|---|---|---|---|---|
| | 6 | 7 | 7.5 | 8 | 9 |
| "H" test (lbs./end) | 3.2 | 17.2 | 16.3 | 15.4 | 8.0 |

The above data warrant the same general conclusions as in Example I.

Resort may be had to modifications and variations of the disclosed embodiments without departing from the spirit of the invention or the scope of the appended claims.

What is claimed is:

1. A process for preparing a latex of an isoolefin-multiolefin butyl rubber copolymer which comprises emulsifying a solution of the copolymer containing a phenol aldehyde resin with, as the sole emulsifier, an aqueous solution of about 0.5 to 10.0 weight percent of at least one ammonium salt of an alkyl sulfate having the formula $CH_3(CH_2)_xSO_4NY$ in which X is 6 to 24, Y being selected from the group consisting of $H_4$, $H_3(C_nH_{2n}OH)$, $H_2(C_nH_{2n}OH)_2$, $H(C_nH_{2n}OH)_3$, $H_3(C_mH_{2m+1})$ $H_2(C_mH_{2m+1})_2$, $H(C_mH_{2m+1})_3$ and mixtures thereof in which $n=1$ to 6 and $m=1$ to 10, and regulating the pH of the latex formed to between about 7.0 and 8.5.

2. A process according to claim 1 in which the alkyl sulfate salt is present in an amount of about 1 to 5 parts per 100 parts of water and the pH of the resulting latex is between about 7.0 and 8.0.

3. A process according to claim 1 in which the solvent for the isoolefin-multiolefin butyl rubber copolymer is a $C_5$ to $C_{10}$ hydrocarbon which is subsequently volatilized.

4. The process according to claim 1 in which the alkyl sulfate salt comprises ammonium lauryl sulfate.

5. A process for preparing a latex of an isoolefin-multiolefin butyl rubber copolymer which comprises dispersing an aqueous solution containing a phenol aldehyde resin and as the sole emulsifier about 0.5 to 10.0 parts by weight of at least one ammonium salt of lauryl sulfate into an isoolefin-multiolefin butyl rubber copolymer-containing solution as the continuous phase and continuing aqueous solution addition until inversion takes place to give a dispersion in which the aqueous solution is the continuous phase, and regulating the pH of the latex formed to between about 7 and 8.

6. A process according to claim 5 in which the latex formed is regulated to a pH of between about 7.50 and about 7.75.

7. A process according to claim 1 in which the pH of the latex is adjusted to between about 7.3 and 8.0.

8. A process according to claim 1 in which the alkyl sulfate salt comprises triethanolammonium lauryl sulfate.

9. A process according to claim 1 in which the alkyl sulfate salt comprises triethylammonium stearyl sulfate.

10. A process according to claim 1 in which the alkyl sulfate salt comprises diethanolammonium lauryl sulfate.

11. A process according to claim 1 in which the alkyl sulfate salt comprises monoethanolammonium cetyl sulfate.

12. A process according to claim 5 in which the lauryl sulfate salt is present in amounts of about 1 to 5 parts per 100 parts of water.

13. A process according to claim 5 in which the lauryl sulfate salt comprises ammonium lauryl sulfate.

14. A process according to claim 5 in which the lauryl sulfate salt comprises triethanolammonium lauryl sulfate.

15. A process according to claim 5 in which the lauryl sulfate salt comprises diethanolammonium lauryl sulfate.

References Cited in the file of this patent

UNITED STATES PATENTS

| 2,354,426 | Briant | July 25, 1944 |
| 2,652,353 | Wilson | Sept. 15, 1953 |
| 2,708,192 | Joesting | May 10, 1955 |
| 2,748,049 | Kalafus | May 29, 1956 |
| 2,799,662 | Ernst et al. | July 16, 1957 |
| 2,848,355 | Bartell | Aug. 19, 1958 |
| 2,943,664 | Baldwin et al. | July 5, 1960 |

FOREIGN PATENTS

| 555,351 | Great Britain | Aug. 18, 1943 |

OTHER REFERENCES

Schwartz et al.: "Surface Active Aents and Detergents," pages 40–61, Interscience Publishers, Inc., New York, published 1958.